(12) United States Patent
Rosenberg Maffia et al.

(10) Patent No.: US 11,587,450 B2
(45) Date of Patent: Feb. 21, 2023

(54) APPARATUS FOR EVALUATING CONTEXTUAL LEARNING

(71) Applicant: Wisconsin Alumni Research Foundation, Madison, WI (US)

(72) Inventors: Peter Ari Rosenberg Maffia, Madison, WI (US); Brittany Travers, Madison, WI (US); Adhira Sunkara, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 846 days.

(21) Appl. No.: 16/524,979

(22) Filed: Jul. 29, 2019

(65) Prior Publication Data

US 2021/0035460 A1  Feb. 4, 2021

(51) Int. Cl.
*G09B 5/02* (2006.01)
*G02B 27/00* (2006.01)
*G06K 9/62* (2022.01)
*G06V 10/70* (2022.01)
*G06V 10/22* (2022.01)
*G06V 10/774* (2022.01)
*G06V 10/82* (2022.01)

(52) U.S. Cl.
CPC ........... *G09B 5/02* (2013.01); *G02B 27/0093* (2013.01); *G06K 9/6218* (2013.01); *G06V 10/22* (2022.01); *G06V 10/70* (2022.01); *G06V 10/768* (2022.01); *G06V 10/774* (2022.01); *G06V 10/82* (2022.01)

(58) Field of Classification Search
CPC ....................................................... G09B 5/02
See application file for complete search history.

(56) References Cited

U.S. PATENT DOCUMENTS

2020/0155053 A1* 5/2020 Bernstein ............... A61B 5/163

OTHER PUBLICATIONS

Marvin M. Chun et al.; "Contextual cueing: Implicit learning and memory of visual context guides spatial attention." Cognitive psychology 36, No. 1 (1998): pp. 28-71, US.

* cited by examiner

*Primary Examiner* — Olisa Anwah
(74) *Attorney, Agent, or Firm* — Boyle Fredrickson, S.C.

(57) ABSTRACT

An apparatus for clinical evaluation of sensitivity of individuals to learning context provides a visual search task in which a target symbol to be located is associated with context images that cluster around the target symbol to varying degrees. Measurement of a rate of unconscious exploitation of the context symbols in finding the target symbols is used to sort the individuals into categories believed to be useful for characterizing their learning styles.

14 Claims, 7 Drawing Sheets

APPARATUS FOR EVALUATING CONTEXTUAL LEARNING

STATEMENT REGARDING FEDERALLY SPONSORED RESEARCH OR DEVELOPMENT

Cross Reference to Related Application

BACKGROUND OF THE INVENTION

The present invention relates to clinical diagnostic equipment and in particular to an apparatus and method for assessing an individual's sensitivity to contextual cues during learning, an assessment that may be useful, for example, in developing educational programs for individuals with autism spectrum disorder and the like.

Autism spectrum disorder (ASD) encompasses a variety of developmental disorders affecting communication and behavior. The wide variability in learning performance among individuals with ASD makes it difficult to determine best strategies for learning for a given individual. The present inventors have previously developed an apparatus that can highlight differences between individuals with ASD in completing a visual search task by measuring response speed in locating a visual target and changes in that response speed when contextual cues are added and removed.

SUMMARY OF THE INVENTION

The present inventors have now determined that individuals with ASD can be robustly assigned to two distinct groups based on an individual's sensitivity to contextual information and changes in that sensitivity over time. This analysis appears to capture an individual's ability to learn from context and thus promises to provide a basis for new learning strategies that can be targeted to subgroups of individuals with ASD.

More specifically, in one embodiment, the invention provides an apparatus for evaluating contextual learning in individuals including a visual display adapted to display at least one target image and a plurality of context images different from the target image and a user input device for inputting an identified location of a target image on the visual display by a user. An electronic computer communicates with the visual display and the user input device and executing a program stored in non-transitory computer medium to: (a) variably control a target location of a target image in the visual display; (b) variably control context locations of a plurality of context images in the visual display characterized by a context density describing a degree to which the context images are near the target image; and (c) record a response time required for the user to identify the location of the target image using the user input device. Steps (a)-(c) are repeated for a set of trials having different values of the context density and for that set of trials a relationship between response time and value of the context density is evaluated. A user of the device is identified to one of at least two categories of contextual learning according to the relationship between response time and value of the context density such as indicates an effect of context density in reducing response time.

It is thus a feature of at least one embodiment of the invention to provide a test that can quickly isolate an individual's sensitivity to context in learning, something that may be useful, for example, for structuring learning programs for the individual.

A user may be identified into one of at least two categories of contextual learning according to a slope in the relationship of context density to response time, where individuals with reduced contextual learning have a more pronounced decrease in response time with increased context information.

It is thus a feature of at least one embodiment of the invention to make use of the insight that individuals who have trouble making use of contextual cues may nevertheless, counterintuitively, have initial heightened sensitivity to the context images.

The electronic computer may further the program to repeat the set of trials for a set of sessions such that the users may be identified to one of at least two categories of contextual learning according to a change in the relationship between response time and context density as a function a time order of the session.

It is thus a feature of at least one embodiment of the invention to provide a robust test that can characterize an individual's sensitivity to context in learning. By looking not only at how response times improved with greater context data but also how this improvement changes over time, learning can be distinguished from confounding features such as differences in visual saliency of the context data.

The relationship between response time and context density can be characterized with a first slope value of response times as a function of context density for each trial, and the change in the relationship between response time and context density as a function of a time order of the session can be characterized with a second slope value of the first slope values as a function of time order of the session and wherein the categories are dependent on the second slope value.

It is thus a feature of at least one embodiment of the invention to measure not only sensitivity to context data but how the sensitivity changes with learning.

The output may indicate a category of the user with respect to context rule sensitivity during learning.

It is thus a feature of at least one embodiment of the invention to provide a simple categorization that can be linked to specific teaching strategies.

The output may indicate a category and a measure dependent on separation of the second slope value from a threshold slope value indicating a robustness of the categorization.

It is thus a feature of at least one embodiment of the invention to provide information about how well an individual conforms to the category.

The visual display may also be adapted to display a plurality of filler images different from the context images and the target image, and the electronic computer may further variably control filler locations of a plurality of filler images in the visual display to increase a uniformity of distribution of images on the display over a uniformity of the context images and target image alone.

It is thus a feature of at least one embodiment of the invention to provide a narrow channel of context information related to letter image types rather than image distribution by using filler images to provide a roughly uniform distribution of images.

Similarly, each of the context images, target image, and filler images have matching line densities and areas of circumscribing rectangles.

It is thus a feature of at least one embodiment of the invention to promote image interpretation as the channel of context information rather than visual density or size.

The images may include the letters C, F, and I.

It is thus a feature of at least one embodiment of the invention to make use of images related to common letters and thus highly relevant to many learning tasks.

The rotational orientation of the images may be varied among the images.

It is thus a feature of at least one embodiment of the invention to promote higher level image processing tasks in the user requiring rotational transformation of the images.

The apparatus may further include an eye tracking camera and the electronic computer may communicate with the eye tracking camera to determine a set of viewing locations by the user on the display during the sessions to measure eye movements selected from at least one of: time to first saccade, saccade distance, number of fixations, fixation duration, and number of blinks, and the computer may identify the user to one of at least two categories of contextual learning according to a change in the relationship between response time and context density as a function of time order of the session and at least one of the measures of eye movements.

It is thus a feature of at least one embodiment of the invention to supplement the categorization provided by context sensitivity measurements in the visual search task with eye tracking information that can provide additional insight and more robust categorization.

These particular objects and advantages may apply to only some embodiments falling within the claims and thus do not define the scope of the invention.

DETAILED DESCRIPTION OF THE PREFERRED EMBODIMENT

Figure 1:
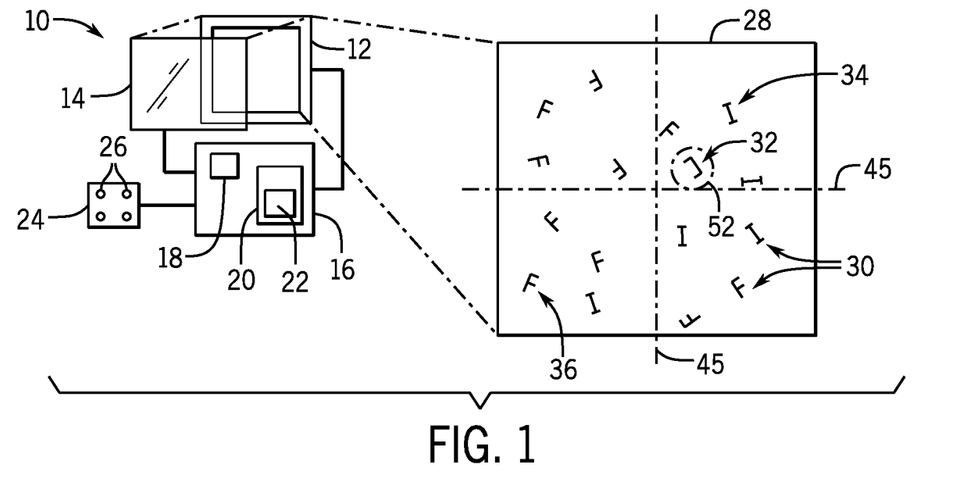
FIG. 1 is a block diagram of the hardware components of the present invention operating to provide a visual search task, the components including a computer for executing a program implementing the present invention and further showing an example screen display generated by the present invention.

Referring now to FIG. 1, an apparatus 10 for assessing contextual learning may include a computer screen 12, for example, an LCD display, providing for the rendering of images and text. The computer screen 12 may further include a touchscreen 14 for electronically sensing a location of a touch registered to images on the screen 12.

The computer screen 12 and touchscreen 14 may connect to electronic computer 16 having one or more processors 18 communicating with a computer memory 20 (for example, random access memory and disk drive) holding a program 22 as will be discussed below. In one embodiment, a switchbox 24 may be provided typically in lieu of the touchscreen 14 having a set of pushbutton switches 26 whose operation will be described below.

Generally memory 20 may also include operating systems and drivers for the various hardware components as well as interface electronics, for example, to the data entry devices and to a network.

During use, the screen 12 provides a rendered display 28 on which a set of images 30 may be located at various points in two dimensions over the rendered display 28. In one embodiment three different types of images 30 will be provided in the form of capitalized letters. These images 30 include a single target image 32 having the form of a capital letter C, multiple context images 34 having the form of a capital letter I, and multiple filler images 36 having the form of a capital letter F. Generally each of the images 30 will be nonoverlapping and distributed approximately evenly over the surface of the display 28 in various orientations.

Figure 2:
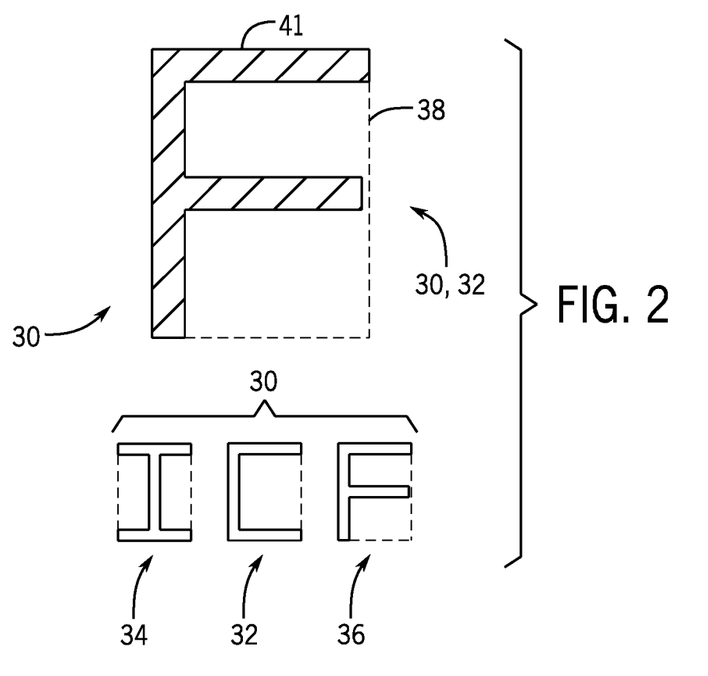
FIG. 2 is a representation of example images used in the screen display showing circumscribing rectangles and line densities.

Referring now to FIG. 2, in one embodiment, the images 30 are selected to have approximately the same image area described by a bounding rectangle 38 being a smallest rectangle that can hold the image 30. Images 30 are also selected to have the same visual density defined by the proportion of image lines 41 (describing the stems and arms of the letters) with respect to the total area of the bounding rectangle 38. In addition, the images 30 may be rendered in monochrome (black and white). In this way the images 30 must be primarily distinguished according to their interpretation as letters rather than simply by visual density, size, or color.

Figure 3:
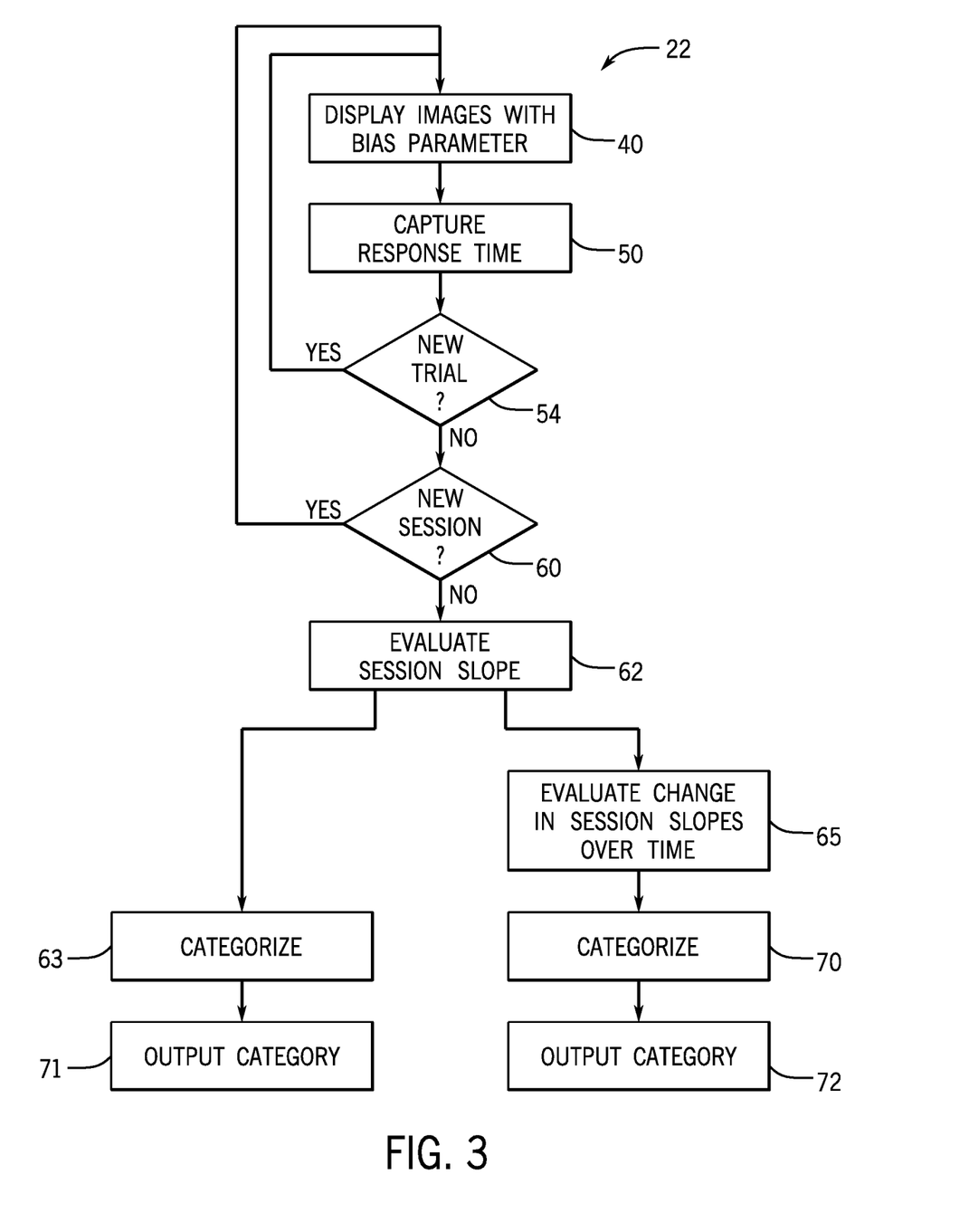
FIG. 3 is a flowchart of the program of FIG. 1 providing the generation of screen displays per FIG. 1 and measurement of response time and analysis of that time.

Referring now to FIGS. 1 and 3, during use of the apparatus 10, the program 22 may provide for a new display of images 30 per process block 40. As noted above the images will appear to be randomly distributed in space over the area of the display 28 with apparently random rotations of the images 30 about axes perpendicular to the face of the display 28.

As will be discussed in greater detail below, although the images 30 appear to be randomly distributed, the context images 34 (letters I) will be clustered near the target image (letter C) providing context information to an individual tasked to search for the target image 32, The amount of clustering will be varied between each trial as noted below.

Figure 4:
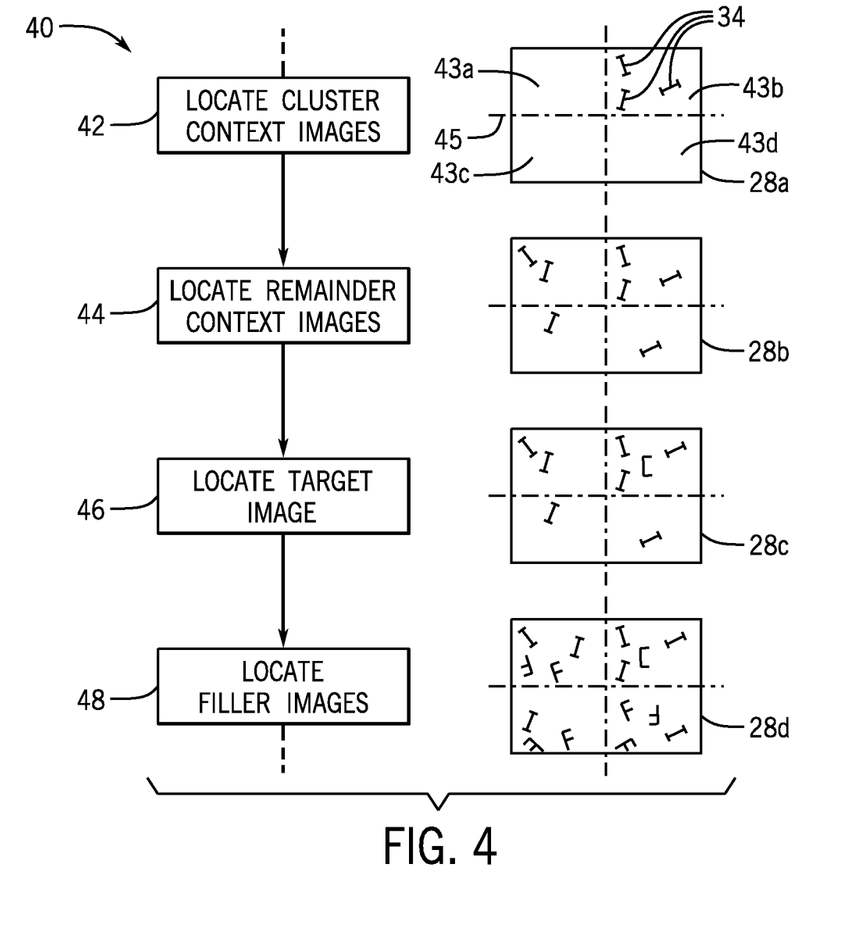
FIG. 4 detailed flowchart and representative screen displays describing the steps of locating, images on the screen to generate the screen display of FIG. 1.

Referring now to FIG. 4, in one embodiment, this clustering of the context images 34 may be accomplished by first distributing a sum of a fixed number of context images 34 into a randomly chosen quadrant 43 (43b as depicted) randomly distributed within that quadrant 43 per process block 42 and as shown in display 28a. As an example, the fixed number of context images 32 may be set at 11. Pseudo-random numbers may be generated from a Poisson distribution ($\lambda=10$) until a number is obtained that is less than or equal to 11 (the maximum number of context images 32). That number of context images 32 is then assigned to the randomly chosen quadrant 43b where each quadrant 43 has an equal chance of being selected.

If the number of assigned context images 34 is less than 11, additional pseudo-random numbers are generated from a new Poisson distribution (λ=5) until a generated number plus the previously assigned number of context images 34 is less than or equal to 11. The second generated number of context images 34 is then randomly assigned to one of the remaining quadrants with equal probability as shown by display 28b and per process block 44. It will be appreciated that these values of λ may be adjusted not only to adjust the clustering but according to the number of context images where a larger value of λ would be used to obtain adequate clustering.

If the total number of assigned context images 32 is less than 11, the remaining context images 34 necessary to bring the total number of context images 34 to 11 are distributed pseudo-randomly across the four quadrants 43 with equal probability. This assignment strategy promotes the possibility that a quadrant would contain a large number of context images 32. As noted above, within each quadrant, the context images 32 are located pseudo-randomly without overlap. The values of λ define a bias controlling how the values of I cluster and will generally be held constant during multiple trials and sessions; however the invention contemplates that this value may also be changed.

At process block 46 and referring to display 28c, a target image 32 (the letter C) is next assigned to a quadrant 43 according to a probability described by the formula:

$$P(C) = 25 + W_I \cdot \left[ N_I - \frac{(11 - N_I)}{3} \right] \quad (1)$$

where P(C) is the probability that the target image 32 would be in a quadrant 43 containing $N_1$ context images 34 and the parameter $W_1$ (weight) determines how much each context image 34 influences the probability that the target image 32 would be in the quadrant 43. For $W_1$, there is no contextual information about the target image 32 provided by the context images 32 because each quadrant 43 has a 25% chance of containing the target image 32. For $W_1$=6.81, (the largest valid value for 11 context images 34), maximal contextual information about the location of the target image 32 location is provided by the context images 34 because the target image 32 has to be in a quadrant containing all 11 context images 34. Generally, the value of W may be held constant during the trials and sessions described herein however the invention contemplates that it may also be varied in certain circumstances for example to detect the ability of the user to "unlearn" a contextual association.

It should be noted that when the value of $W_1$ is fixed it nevertheless provides different context densities in different trials, the latter indicating the proportion of context images 34 in the quadrant containing the target image 32. Note that the value of $W_1$ is not the same as the context density because $W_1$ only controls a probability that a particular context density will be produced.

Next, as indicated by process block 48 and referring to screen display 28d, filler images 36 are assigned to roughly equalize the distribution of images 30 over the screen display 28. In this example, the filler images 36 may be assigned so that each quadrant 43 has twelve total images 30. As with the target image 32 in the context images 34, the filler images 36 are placed pseudo-randomly in the selected quadrant 43 while avoiding overlap with other images 30.

The quadrants 43 may, but need not be visually demarcated by quadrant lines 45 depending on whether the switch-box 24 is used or the touchscreen 14 is used and more generally, the distribution can be controlled in a similar fashion without the need for reference to quadrants at all.

Referring again to FIG. 3, for each trial, after a distribution of images 30 is produced according to process block 40, the response time of the user in identifying the target image 32 is measured as indicate by process block 50. Referring to FIG. 1, the user response may be pressing, of a particular pushbutton switch 26 associated with a given quadrant 43 of the display 28 having the target image 32 or may be by means of a screen touch by the user's finger or stylus within a focus region 52 around a particular image 30. The response time is recorded together with the context density associated with the particular screen display 28 of that trial.

At decision block 54, a determination is made as to whether a new trial should be performed as part of a data collection of the present invention and if so, process blocks 40 and 50 are repeated but for new distributions of the images 30 typically having a different context density.

After a number of trials have been performed (for example, fifty) providing a good spread of different context densities, at decision block 54, the program proceeds to decision block 60 to determine whether a new session should be initiated. For example, a study may consist of three sessions. For each session, process blocks 40, 50, and 54 are repeated, again collecting response times associated with context densities of the displays 28 associated with each trial of the session. The response times are also linked to the session numbers which will allow an analysis of Change in the individual's response time to be determined with respect to increased experience by the user over time as multiple sessions are completed.

Figure 5:
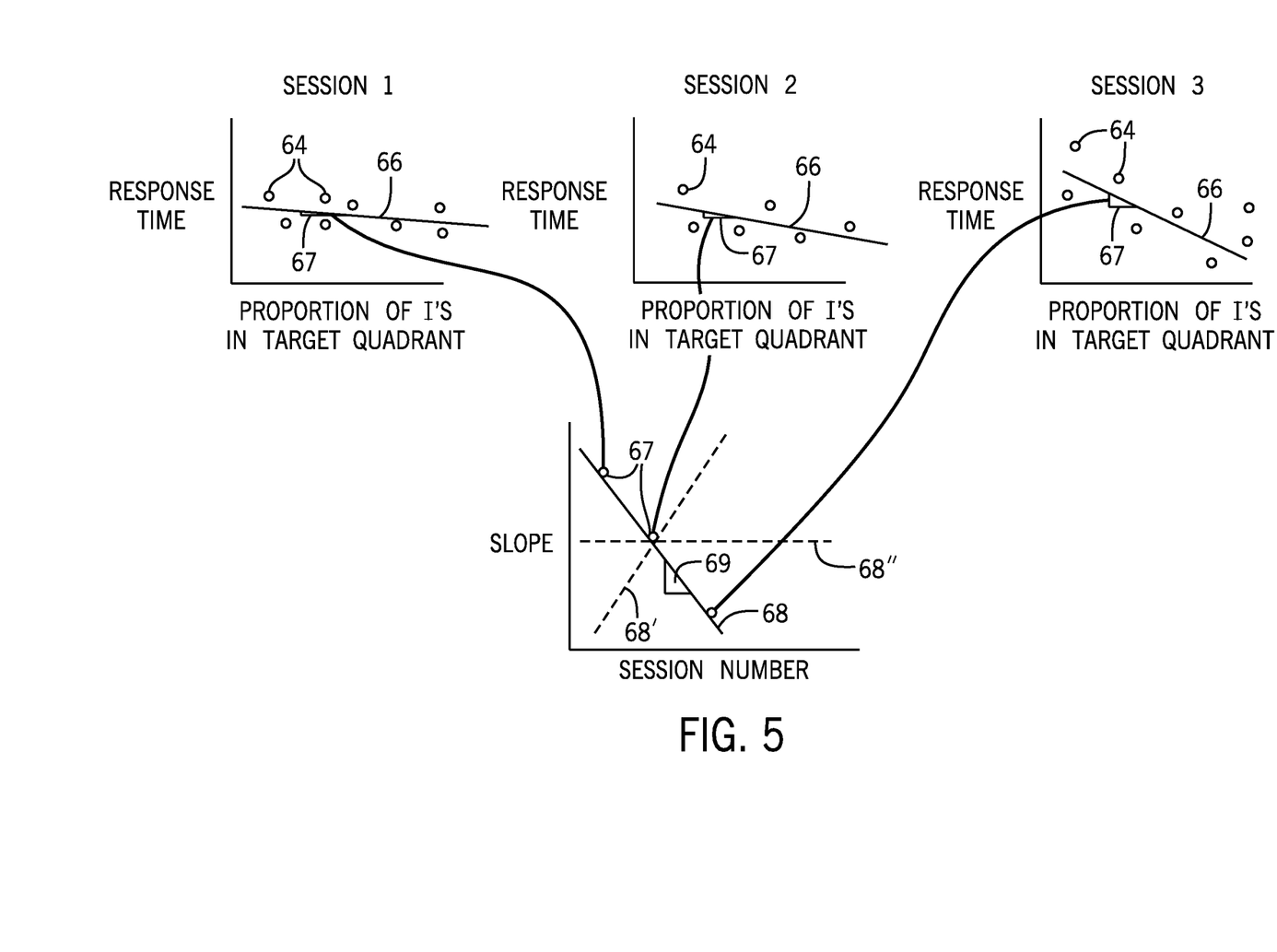
FIG. 5 a graphic representation of the data collected during a set of trials completed by the user in different sessions and the analysis of those sessions to produce a slope indicating contextual learning.

When all the sessions have been completed per decision block 60, the program proceeds to a first analysis block 62 in which the response times in the individual sessions are independently analyzed, in that analysis, a relationship between response time and the context density (i.e. the proportion of context images 34 in the quadrant holding the target image 32) is analyzed to determine the degree to which context images 34 assist the user in identifying the target image 32. Referring also to FIG. 5, in this analysis, response time measurements 64 for each trial are plotted against the context density for that trial and a line 66 having a slope 67 is shown fit to those data points, for example, by a least square fitting process. It will be appreciated that other similar techniques may be performed to capture this general relationship between context density and response time including other analytical techniques such as cluster analysis and the like. This analysis is repeated for each session. Generally but not necessarily, this slope 67 for each set of trials will be negative as a function of both increased experience by the user in identifying the location of the target image 32 and possible implicit use of the context images 34 to identify the location of the target image 32. A negative slope can also appear to the extent that context variables have visual saliency, that is they may attract the eye of the user to promote a search in that region without the user consciously or unconsciously recognizing the value of the context variables as far as predicting the location of the target image 32.

As indicated by process block 63, the slope of a single session may be used to categorize the individual according to the observation that individuals who have trouble using context information, counterintuitively, tend to exhibit an extremely large negative slope in response time versus context density. This negative slope suggests a high degree of context sensitivity but may be instead related to a hyper-sensitivity to the context symbols without an understanding of the context information contained in those symbols. Accordingly a classification related to the slope value of a single session may be used to categorize individuals as context-sensitive or context insensitive. This categorization may be output as indicated by process block 71.

As indicated by process block 65 of FIG. 3, alternatively or in addition, the slopes 67 determined for each session may then be plotted and fit to a line 68 to provide a slope 69 generally indicating the degree to which the user's implicit learning of the significance of the contextual cues 34 over time facilitates the search for the target. This understanding is of the context information implicit to the extent that it does not appear to be recognized consciously by the user. This second level of analysis considers how context sensitivity changes over time, and largely compensates for problems of increased visual saliency with respect to the analysis of process block 62 as well as for the effects of experience in searching for the target image 32 independent of the influence of the context images 34.

A line 68 with a negative slope is consistent with increased use by the user of the context images 34 over time to identify the location of the target image 32 whereas a slope of zero per line 68' or a positive slope per line 68" suggests a lack of learning of the value of the context images 34.

At process block 70, the slope 69 may be compared to a threshold slope (for example, a slope of zero) to separate users into two learning categories of different slope magnitudes. Other threshold slopes may be used or this threshold slope refined according to further empirical studies and the invention generally contemplates that a wide variety of analytical tools (e.g. cluster analysis) may be used to categorize this basic relationship between linkage of context density and response time as it changes over time.

Figures 6, 7:
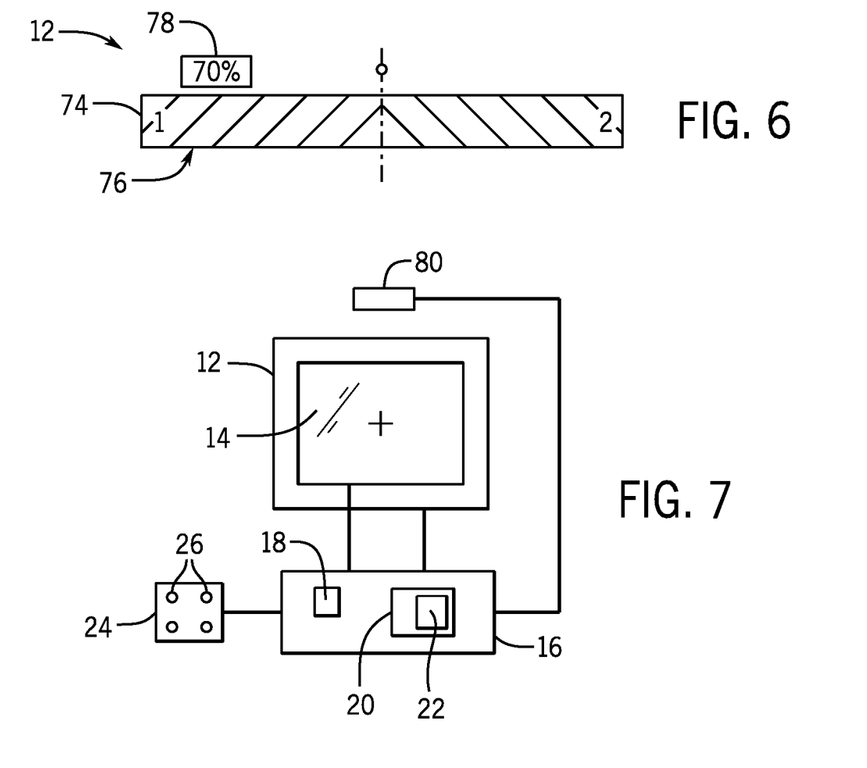
FIG. 6 is an example output display categorizing an individual with respect to contextual learning both qualitatively and quantitatively.
FIG. 7 is a figure similar to FIG. 1 showing the addition of an eye tracking camera.

At process block 72, the results of this categorization may be displayed, for example, using a bar scale 74 indicating at one end a categorization 1 and at the other end a categorization 2, for example, with the colored gradient there between. A slider arrow 76 may move along the bar scale 74 to indicate the user's categorization on the scale and a quantitative caption 78 may be provided indicating the robustness of this categorization, for example, by comparing the difference between the slope 68 and the threshold slope.

Categorization of individuals in this manner may be useful, for example, in developing learning strategies for the user. Users who have low contextual learning may, for example, be given environments with emphasized or explicit context rather than the implicit context of the present invention or that highlight implicit context that would otherwise be unrecognized. Similarly, learning processes may be streamlined for those with high contextual learning.

Figure 8:
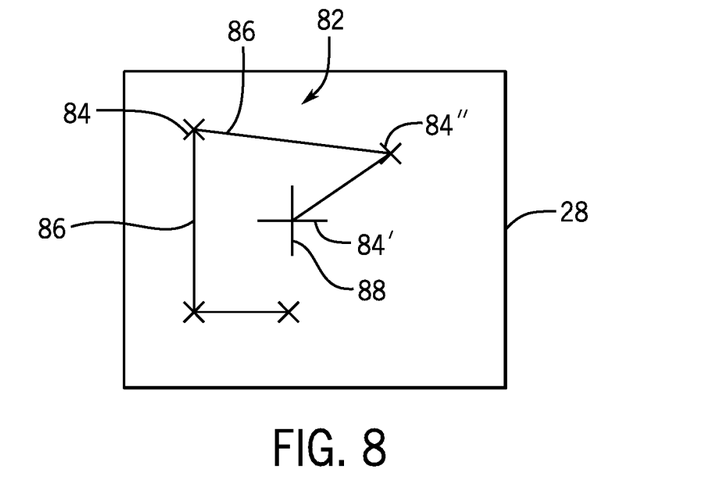
FIG. 8 is an example eye track showing saccades, fixation points and trajectory length.
Figure 9A:
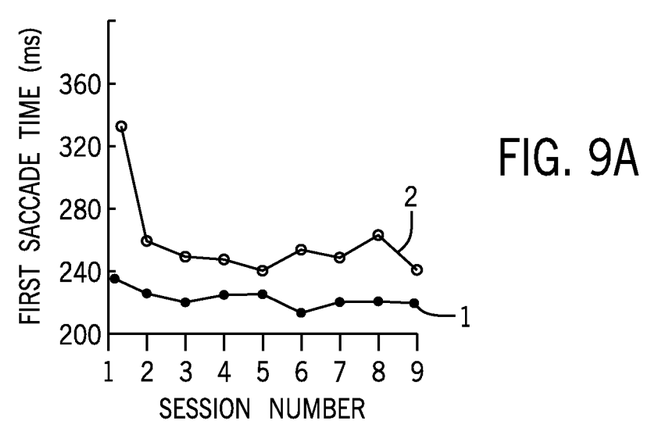
FIGS. 9a-e are set of charts showing measurements of the eye tracking data for the categorizations provided by the present invention that may augment categorization provided by the present invention.
Figure 9B:
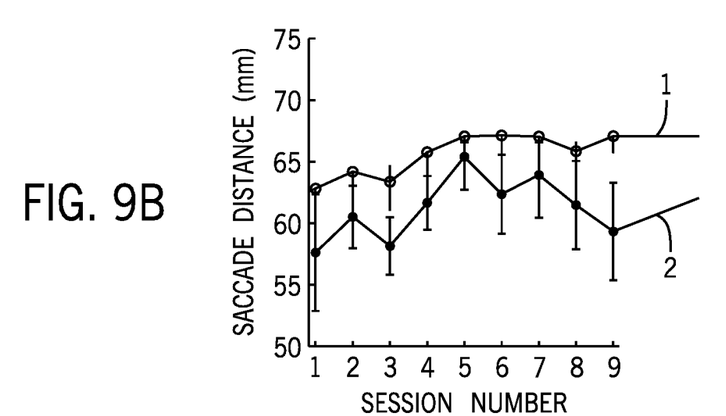
Figure 9C:
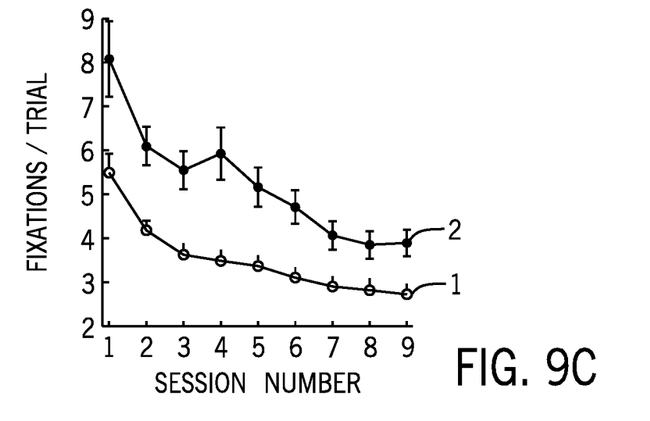
Figure 9D:
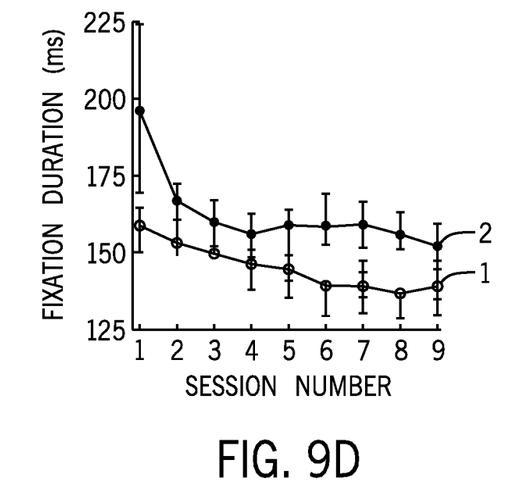
Figure 9E:
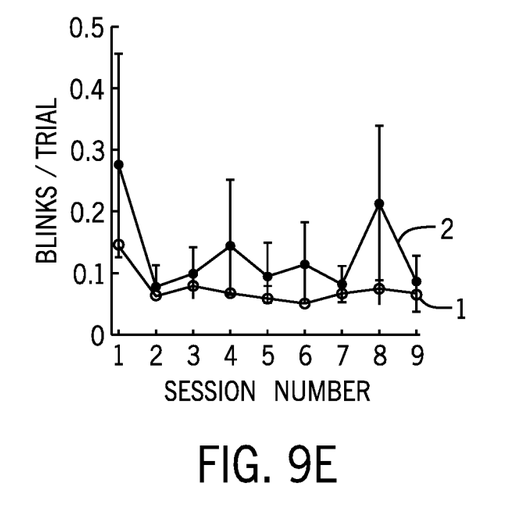

Referring now to FIG. 7, the categorization of the present invention may be augmented, for example, through the use of an eye tracking system 80 installed on the computer screen 12 and also communicating with the computer 16. During each trial, an eye trajectory 82 of the user may be captured as shown in FIG. 8 and analyzed to detect the fixation points 84 with respect to the display 28 where the user's eyes rest, the duration of those rests as well as the length of the saccades 86 being movements between fixation points. When the eye tracking system 80 is used, a target symbol 88 may be located at the center of the display 28 for initial eye fixation and then removed as the images 30 for a given trial are brought into view.

The present inventors have determined that the categories 1 and 2 discussed above with respect to contextual learning are also reflected in eye tracking movements. In particular, measurements of a time delay from the first fixation points 84' to the second fixation point 84" after the target symbol 88 is removed is measured (first saccade), and the average length of the saccades from start point to finish point of each eye movement during the trial, the number of fixation points 84 during the trial, the average length of the fixation across all fixations, and the number of blinks during the trial are captured and recorded. Examples of these measurements for the categories 1 and 2 are shown respectively in FIGS. 9a-9e.

These distinctions between the categories 1 and 2 are not as distinct as provided by the slope analysis discussed above with respect to process blocks 62 and 65 but can be used to augment that slope analysis, for example, by performing a cluster analysis of these eye movement parameters on an empirically collected data set and using the defined clusters to separate the data of the curves shown in FIGS. 9a-9e. This cluster data can then be used to create a dividing threshold between the categories 1 and 2, and that categorization can be combined with the categorization provided by process block 70, for example, with empirically determined weighting to provide a composite measure.

It will be appreciated that the accuracy of the user in identifying the location of the target image 32 may also be taken into account, for example, by disregarding response times where the target image 32 is not accurately identified, or in counting the number of misidentified target images 32 or the distance between the target image 32 and the identified image 30. These latter two measurements may be used to augment the response time measurements of the present invention, for example, by considering the slope of a weighted function including both response time and accuracy or using these measurements as additional dimensions in a cluster analysis.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted, it is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. An apparatus for evaluating contextual learning in individuals comprising:
    a visual display adapted to display at least one target image and a plurality of context images different from the target image;
    a user input for inputting an identified location of a target image on the visual display by a user; and
    an electronic computer communicating with the visual display and the user input and executing a program stored in non-transitory computer medium to:
    (a) variably control a target location of a target image in the visual display;
    (b) variably control context locations of a plurality of context images in the visual display resulting in a context density describing a degree to which the context images cluster around the target image;
    (c) record a response time required for the user to identify the location of the target image using the user input;
    (d) repeat steps (a)-(c) for a set of trials having different values of the context density;
    (e) for a set of trials evaluate a relationship between response time and value of the context density;
    (f) identify the user to one of at least two categories of contextual learning according to a relationship between response time and value of the context density such as indicates an effect of context density in reducing response time.

2. The apparatus of claim 1 wherein step (f) identifies the user into one of at least two categories of contextual learning according to a slope in the relationship of context density to response time.

3. The apparatus of claim 1 wherein the electronic computer further executes the program to:
    repeat steps (a)-(e) for a set of sessions;
    wherein step (f) identifies the user to one of at least two categories of contextual learning according to a change in the relationship between response time and the values of context density as a function a time order of the session.

4. An apparatus for evaluating contextual learning in individuals comprising:
    a visual display adapted to display at least one target image and a plurality of context images different from the target image;
    a user input for inputting an identified location of a target image on the visual display by a user; and
    an electronic computer communicating with the visual display and the user input and executing a program stored in non-transitory computer medium to:
    (a) variably control a target location of a target image in the visual display:
    (b) variably control context locations of a plurality of context images in the visual display resulting in a context density describing a degree to which the context images cluster around the target image;
    (c) record a response time required for the user to identify the location of the target image using the user input;
    (d) repeat steps (a)-(c) for a set of trials having different values of the context density;
    (e) for a set of trials evaluate a relationship between response time and value of the context density;
    (f) identify the user to one of at least two categories of contextual learning according to a relationship between response time and value of the context density such as indicates an effect of context density in reducing response time;
    wherein the relationship between response time and context density can be characterized with a first slope value of response times as a function of context density for each trial, and the change in the relationship between response time and context density as a function of a time order of the session can be characterized with a second slope value of the first slope values as a function of time order of the session and wherein the categories are dependent on the second slope value.

5. The apparatus of claim 4 wherein electronic computer further provides an output indicating a category of the user with respect to contextual sensitivity during learning.

6. The apparatus of claim 5 wherein the output indicates two categories and a range between the two categories.

7. An apparatus for evaluating contextual learning in individuals comprising:
    a visual display adapted to display at least one target image and a plurality of context images different from the target image;
    a user input for inputting an identified location of a target image on the visual display by a user; and
    an electronic computer communicating with the visual display and the user input and executing a program stored in non-transitory computer medium to:
    (a) variably control a target location of a target image in the visual display;
    (b) variably control context locations of a plurality of context images in the visual display resulting in a context density describing a degree to which the context images cluster around the target image;
    (c) record a response time required for the user to identify the location of the target image using the user input;
    (d) repeat steps (a)-(c) for a set of trials having different values of the context density;
    (e) for a set of trials evaluate a relationship between response time and value of the context density;
    (f) identify the user to one of at least two categories of contextual learning according to a relationship between response time and value of the context density such as indicates an effect of context density in reducing response time;

wherein the visual display is further adapted to display a plurality of filler images different from the context images and the target image; and wherein the electronic computer further variably controls filler locations of a plurality of filler images in the visual display to increase a uniformity of distribution of images on the display over a uniformity of the context images and target image alone.

8. The apparatus of claim 7 wherein each of the context images, target image, and filler images have matching line densities and areas of circumscribing rectangles.

9. The apparatus of claim 7 wherein the images include letters C, F, and I.

10. The apparatus of claim 1 wherein rotational orientation of the images is varied among the images.

11. The apparatus of claim 1 wherein the visual display is selected from the group consisting of a computer display having a touchscreen and a computer display associated with a switch box.

12. An apparatus for evaluating contextual learning in individuals comprising:
   a visual display adapted to display at least one target image and a plurality of context images different from the target image;
   a user input for inputting an identified location of a target image on the visual display by a user; and
   an electronic computer communicating with the visual display and the user input and executing a program stored in non-transitory computer medium to:
   (a) variably control a target location of a target image in the visual display;
   (b) variably control context locations of a plurality of context images in the visual display resulting in a context density describing a degree to which the context images cluster around the target image;
   (c) record a response time required for the user to identify the location of the target image using the user input;
   (d) repeat steps (a)-(e) for a set of trials having different values of the context density;
   (e) for a set of trials evaluate a relationship between response time and value of the context density;
   (f) identify the user to one of at least two categories of contextual learning according to a relationship between response time and value of the context density such as indicates an effect of context density in reducing response time;
   wherein the electronic computer further executes the program to record whether the user has correctly identified the location of the target image and wherein the user is identified to the at least two categories of contextual learning also according to whether the target image has been correctly identified.

13. The apparatus of claim 12 wherein the electronic computer further executes the program when the user has not correctly identified the location of the target image to record a distance between an identified image and the target image and wherein the user is identified to the at least two categories of contextual learning also according to the recorded distance.

14. An apparatus for evaluating contextual learning in individuals comprising:
   a visual display adapted to display at least one target image and a plurality of context images different from the target image;
   a user input for inputting an identified location of a target image on the visual display by a user; and
   an electronic computer communicating with the visual display and the user input and executing a program stored in non-transitory computer medium to:
   (a) variably control a target location of a target image in the visual display;
   (b) variably control context locations of a plurality of context images in the visual display resulting in a context density describing a degree to which the context images cluster around the target image;
   (c) record a response time required for the user to identify the location of the target image using the user input;
   (d) repeat steps (a)-(c) for a set of trials having different values of the context density;
   (e) for a set of trials evaluate a relationship between response time and value of the context density;
   (f) identify the user to one of at least two categories of contextual learning according to a relationship between response time and value of the context density such as indicates an effect of context density in reducing response time;
   further including an eye tracking camera and wherein the electronic computer communicates with the eye tracking camera to determine a set of viewing locations by the user on the display during the sessions to measure eye movements selected from at least one of: time to first saccade, saccade distance, number of fixations, fixation duration, and number of blinks, and wherein the computer identifies the user to one of at least two categories of contextual learning according to a change in the relationship between response time and context density as a function of a time order of the session and at least one of the measures of eye movements.

* * * * *